2,906,707
SOLVENT EXTRACTION OF HYDROCARBON MIXTURES

Ernest L. Pollitzer, Hinsdale, Ill., assignor, by mesne assignments, to Universal Oil Products Company, Des Plaines, Ill., a corporation of Delaware No Drawing. Application February 25, 1957
Serial No. 641,817

6 Claims. (Cl. 208—325)

This invention relates to a process for selectively recovering relatively unsaturated hydrocarbons from mixtures of the same with their more saturated analogs and homologs by the method which comprises contacting the mixture with a solvent selectively miscible with the relatively unsaturated component and recovering, if desired, the hydrocarbon solute from the resulting rich solvent. More specifically, this invention concerns a solvent extraction process utilizing the sulfoxide of a thioether as the solvent selectively miscible with the relatively unsaturated component of the hydrocarbon mixture.

The properties of an organic compound which make it particularly suitable as a selective solvent for the extraction and recovery of one or more components or class of components of a hydrocarbon mixture is (1) its capacity to dissolve hydrocarbons, a property referred to in the art as its solvency characteristic, (2) its capacity to selectively dissolve a particular class of hydrocarbons and to reject other types of hydrocarbons mixed therewith in the feed stock, a property referred to in the extraction art as the selectivity characteristic of the solvent, (3) a positive temperature versus solubility ratio whereby the total quantity of hydrocarbon which dissolves in the solvent increases as the temperature of the solvent increases, (4) a boiling point sufficiently high that the solvent may be utilized in an extraction process without the necessity of employing an excessively high pressure, and (5) the ability of the solvent to form a rich solvent phase which is readily separable by phase separation from the raffinate hydrocarbon phase when the solvent contains the extract hydrocarbon in solution therewith. It has now been found that a class of compounds collectively referred to herein as the oxo derivatives of certain thioethers, hereinafter more specifically characterized and identified, as a class, possess the foregoing desired characteristics of selective solvents for the extraction and recovery of specific components of hydrocarbon mixtures, especially the components in which the carbon-to-hydrogen ratio is high relative to other components of the hydrocarbon mixture.

In one of its embodiments, this invention concerns a process for recovering a hydrocarbon having a relatively large carbon-to-hydrogen ratio which comprises contacting said mixture with a solvent selectively miscible with said hydrocarbon of relatively high carbon-to-hydrogen ratio consisting of an aqueous solution of a compound having the formula

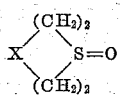

wherein X is selected from the group consisting of oxa, thia, and sulfoxy, said contact being effected at a temperature and pressure sufficient to maintain said solvent in substantially liquid phase, and thereafter separating a hydrocarbon phase from a predominantly liquid solvent phase containing dissolved therein said hydrocarbon of relatively large carbon-to-hydrogen ratio.

The organic compounds herein designated as the organic, primary solvent component are cyclic compounds corresponding to the following general and empirical formula

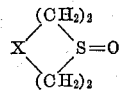

wherein X is a bivalent radical selected from the group consisting of oxa, thia, and sulfoxy. Typical representative compounds corresponding to the above formula, named according to the "oxa-aza" system covered by Rule 16 of the International Union of Chemistry System of Nomenclature for heterocyclic compounds are such representative members as 1-thia-4-oxa-cyclohexanone-1 (also referred to as the sulfoxide of 1-thia-4-oxacyclohexane) which has the following formula:

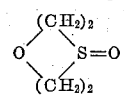

1,4-dithia-cyclohexanone-1, having the formula:

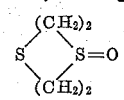

and 1,4-dithia-cyclohexadione-1,4, having the formula:

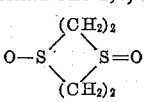

These compounds may be utilized as such in a typical hydrocarbon extraction system or one or more of the above may be mixed with other solvents or solvent modifiers which alter the solvency or selectivity characteristics of the resulting mixture. Thus, of the above compounds, those which contain a relatively high proportion of hydrophilic oxa and thia radicals per molecule, compared to the number of methylene groups generally have relatively high selectivity characteristics, but their solvency is somewhat less than members of the above group in which the ratio of methylene to hydrophilic oxa and thia radicals is comparatively high. For such solvents, it is desirable to mix one or more of the compounds selected with another solvent ingredient having a relatively higher solvency for hydrocarbons than the selected thioether derivative or derivatives. On the other hand, of the above indicated typical compounds contemplated herein, those which contain a relatively greater proportion of methylene radicals to hydrophilic oxa and thia groups have comparatively high solvency properties and their selectivity characteristics may be substantially enhanced by incorporating a hydrophilic solvent or water into the solvent composition. Typical organic compounds having a high solvency for hydrocarbons and which increase the solvency of a solvent composition comprising the present thioethers are selected from those compounds having a relatively large ratio of hydrocarbon residue to the number of hydrophilic groups, including such typical compounds as propylene glycol, dipropylene glycol, tripropylene glycol, etc., the phenols and alkylether derivatives of the phenols, such as phenol itself, thymol and guaiacol; certain aliphatic alcohols, such as methanol, ethanol, etc.

Typical normally liquid organic compounds which are relatively hydrophilic and which may be utilized in admixture with one or more of the above thioether derivatives for the purpose of increasing the selectivity of the present solvent include the alkylene glycols and polyalkylene glycols, such as ethylene glycol, diethylene glycol, triethylene glycol, glycerol, etc., the perfluorinated aliphatic acids, such as perfluoroacetic acid, perfluoropropionic acid, perfluorobutyric acid etc., the nitriles, such as beta, beta'-oxydipropionitrile, succinonitrile and other organic compounds having relatively high boiling points (relative, that is, to the boiling point of the feed stock) commonly recognized in the prior art as suitable solvents for the solvent extraction of hydrocarbon mixtures. A particularly suitable ingredient of the solvent mixture which enhances the selectivity of the above thioether derivatives for the more unsaturated component of the hydrocarbon feed stock (that is, for the component having the highest carbon-to-hydrogen ratio) is water, which may be present in admixture with the present thioether derivative in amounts of from about 0.1% to about 35% by weight of the resultant solvent mixture and preferably from about 2% to about 15% by weight thereof. The water thus incorporated into such a mixed solvent composition also provides a convenient stripping medium for removal of the hydrocarbon solute from the rich solvent stream formed in the extraction zone, water for this purpose being admitted into the stripping zone as steam to reduce the partial pressure of the hydrocarbon solute in the stripping zone, thereby reducing the temperature level to which the rich solvent must be heated in order to strip hydrocarbon solute therefrom. The steam, as a superheated vapor, also provides a convenient means of introducing heat into the stripping section of the recovery zone, although other means are also available.

Mixtures of hydrocarbons suitable as charging stocks in the present separation process contain at least one component selected from the fore part of the series: bicyclo aromatic, mono-cyclic aromatic, cyclo-dienic, alicyclic dienic, cyclo-mono-olefinic, aliphatic mono-olefinic, naphthenic, and aliphatic paraffinic and at least one other succeeding member of this series. Thus, mono-olefins and particularly cyclo-olefins are separable from paraffins; aromatic hydrocarbons are separable from olefins, polycyclic aromatics are separable from benzenoid aromatic hydrocarbons, and naphthenes (cycloparaffins) are separable from aliphatic and cyclic olefins. It will be noted that the solubility of the indicated classes of hydrocarbons increases as the carbon-to-hydrogen ratio in the hydrocarbon class increases, using as a basis of comparison, members having the same number of carbon atoms. In any individual class of hydrocarbons the solubility of particular members of the class in the solvent generally diminishes as the molecular weight of the compound increases. Thus, polycyclic aromatics are generally more soluble in the solvent than a hydrocarbon of the benzenoid series, the solubility of mono- and poly-alkyl-substituted aromatics are less than the non-substituted homologs and long chain alkyl-substituted aromatics are less soluble than their shorter chain length alkyl-substituted homologs. It is characteristic of the present solvents that they generally dissolve hydrocarbons described as "unsaturated" more readily than their "saturated" analogs, although in the case of olefinic hydrocarbons the relatively high molecular weight, straight-chain members of this class containing more than about seven carbon atoms per molecule become more similar to paraffins of the same number of carbon atoms with respect to their solubility in the present solvent extractant than to olefins of smaller size. The lower molecular weight olefinic hydrocarbons containing fewer than about eight carbon atoms per molecule, and the branched-chain olefinic and cyclo-olefinic hydrocarbons, on the other hand, are typically unsaturated hydrocarbons and are selectively extracted by the present solvent from paraffinic hydrocarbons contained in the feed stock.

Typical hydrocarbon mixtures utilizable as charging stocks in the present extraction process include distillate fractions of catalytically cracked naphthas, coal tar distillate fractions, specific boiling range fractions of natural or straight-run petroleum distillates, and narrow or wide boiling range fractions of certain reformed or hydroreformed naphthas, which are generally relatively rich in aromatic hydrocarbons and are particularly valuable as a source of feed stock from which benzene, toluene, and/or the xylenes and ethylbenzene may be extracted. One of the outstanding and particularly useful applications of the present method of separation, providing a means of resolving a mixture of components not readily separable into its constituents by customary methods of separation, as for example by fractional distillation, is the extraction of an azeotropic mixture of hydrocarbons, such as a $C_6$ fraction of a petroleum distillate containing benzene, hexane and heptane isomers or a toluene-heptane-octane mixture, such azeotropic mixtures boiling over a considerable temperature range and containing varying proportions of aromatic hydrocarbon constituents therein.

The present thioether derivatives may be utilized as selective solvents in any convenient system of extraction involving contact between the present thioether derivative-containing solvent supplied in liquid phase and the hydrocarbon feed stock maintained in liquid or vapor state. Thus, the solvent may be countercurrently contacted with the mixed hydrocarbon feed in a liquid-liquid solvent extraction zone, for example, utilizing an absorption type of separation procedure wherein the solvent as the phase of greatest density is introduced into the upper portion of a countercurrent contacting zone and the hydrocarbon feed stock as the phase of lesser density is introduced into the bottom portion of the contacting zone, the resulting two streams being allowed thereafter to flow in countercurrent contact relationship. A so-called rich solvent stream containing the component of the feed stock having the highest carbon-to-hydrogen ratio as a solute in the liquid solvent is removed from the lower portion of the extraction zone, while the non-extracted portion of the feed stock, normally referred to as the raffinate stream is removed from the upper portion of the contacting zone. Provided a sufficient volume of solvent is charged into the contacting zone, compared to the volume of feed stock, the rich solvent stream may contain substantially all of the hydrocarbons present in the feed stock having the largest carbon-to-hydrogen ratio. Similarly, the raffinate stream is composed predominantly of relatively saturated hydrocarbons (that is, the feed stock components having the lowest carbon-to-hydrogen ratio) and if a sufficient volume of solvent is employed to remove all of the extract hydrocarbons from the feed stock, the raffinate may consist exclusively of the more saturated components present in the feed stock. In order to provide a cyclic process in which the solvent is recirculated to the contacting zone after removing extract therefrom the rich solvent may be especially treated, for example, by subjecting it to fractional distillation (the so-called stripping process of the art) in order to recover the desired extract therefrom. In the stripping operation the rich solvent is heated to a temperature above the boiling point of the dissolved hydrocarbon in the presence of a solvent and at the particular pressure maintained in the stripping zone and the solute vapors thereafter flashed overhead from the rich solvent, particularly when accompanied by reducing the pressure above the rich solvent in the stripper. In order to reduce the temperature at which the hydrocarbon extract is stripped from the rich solvent, the latter may be steam distilled by injecting steam (which may be superheated) into the bottom of the stripping zone and collecting the mixed water and hydrocarbon vapors as a side-cut from the stripping zone. The residue remaining in the bottom of the stripper generally consists of substantially regenerated lean solvent which may be partially dehydrated, if necessary, and thereafter recirculated to the contacting or solvent extraction zone for repeated use therein.

Another means of utilizing the present thioether derivatives as solvents in an extraction procedure comprises introducing the solvent, preferably an aqueous mixture of the desired thioether derivative, at a suitable solvent extraction temperature, preferably at least about 20° C. above the end boiling point of the feed stock into an extractive distillation zone into which the feed stock as a vapor is also simultaneously introduced, the resulting extractive distillation procedure resulting in the formation of a liquid phase rich solvent as a separate stream from the raffinate phase recovered from the extractive distillation zone as a vapor.

Since most of the cyclic thioethers herein specified for use as solvents have boiling points substantially above the boiling point of water, the solvent extraction processes utilizing these solvents may be applied to solvent extraction processes operated over a wide range of temperatures below the boiling point of the solvent composition at the particular ambient pressure, although temperatures within a range of from about 50° C. to not substantially in excess of above about 200° C. are particularly preferred. In order to maintain the solvent in substantially liquid phase at these temperatures a superatmospheric pressure may be imposed on the system during the extraction stage, if necessary, particularly when higher temperatures of operation are required to increase solvency and thereby reduce the solvent to feed ratio. Thus, lower solvent to feed ratios may be employed at higher extraction temperatures and by imposing a superatmospheric pressure on the solvent and feed stock in the extraction zone, it becomes possible to operate the latter at a temperature substantially above the boiling point of either the feed stock or solvent, while maintaining both in substantially liquid phase, if desired. Suitable pressures may range from slightly above atmospheric to 10 atmospheres or more, depending upon the boiling points of the phase existing within the extraction zone.

In most instances it is desirable to exclude oxygen from the solvent extraction system, particularly when temperatures above about 120° C. are employed in the extraction of stripping stages of the process to thereby minimize oxidative degradation of the solvent and the formation of by-products which are generally somewhat corrosive and harmful to most extractive equipment.

This invention is further illustrated with respect to several of its specific embodiments in the following examples, which, although illustrative, are not intended to limit the generally broad scope of the invention necessarily in accordance therewith.

*Example I*

Thioxane sulfoxide (known by the I.U.C. or "oxa-thia" system of naming organic compounds as 1-thia-4-oxa-cyclohexanone-1) is mixed with sufficient water to form a solution containing 10% by weight of water. This mixture was contacted in a rotating pressure autoclave with an equal volume of a hydrocarbon mixture containing 75% by weight of methylcyclopentane and 25% by weight of benzene at 121° C. Thereafter, the autoclave was rotated for 0.5 hour at the above temperature, followed by separating the resulting phases into an upper so-called "raffinate" layer and a lower rich solvent layer, the two phases being separated by a well defined interphase. The rich solvent layer, containing 6.2% by weight of hydrocarbon, diluted with 10 volumes of water which resulted in the separation of hydrocarbon phase. The hydrocarbon layer was decanted from the aqueous layer and analyzed by infra-red spectroscopy. The recovered hydrocarbon extract is a mixture of 56.3% by weight of benzene and 43.7% by weight of methylcyclopentane. The hydrocarbon or raffinate layer separated from the rich solvent phase of the initial contacting stage contained 15.5% by weight of benzene and 84.5% by weight of methylcyclopentane. Utilizing the above data and calculating a so-called "selectivity" factor for the above solvent, this factor has a numerical value represented by the following equation:

$$\text{Selectivity} = \frac{E_{\text{benzene}}}{R_{\text{benzene}}} \times \frac{R_{\text{MCP}}}{E_{\text{MCP}}}$$

where MCP denotes methylcyclopentane while E and R represent the percent by weight of each of the indicated constituents in the extract and raffinate phases, respectively. The selectivity for the indicated solvent as thus calculated is equal to 7.02.

Under the same conditions of extraction, utilizing the same feed stock (75% MCP, 25% benzene) and employing various mixtures of water and diethylene glycol in order to achieve a solvent composition having the same selectivity (7.02) as the foregoing thioxane sulfoxide composition, the glycol must contain 18% by weight of water, but the solubility at this selectivity level was a mere 2.0% (compared to 6.2% by weight for the above aqueous thioxane solvent). On the other hand, in order to achieve a solvency of 6.2%, diethylene glycol must contain 8% by weight of water, but at this water content, the selectivity is only 4.7.

*Example II*

In the following run, a mixture consisting of 50% by weight of N-hexene and 50% by weight of N-hexane is contacted with a solvent composition consisting of an aqueous solution of 1,4-dithia-cyclohexanone-1,4 containing 4.5% by weight of water. For this purpose, equal volumes of solvent and the foregoing hydrocarbon mixture are charged into a rotating pressure autoclave and thoroughly mixed for 0.5 hour at 121° C. by rotating the autoclave. From the resulting mixture, a lower layer solvent-rich phase is allowed to settle from an upper layer hydrocarbon phase, the layers being thereafter decanted and reserved for analysis. The hydrocarbon layer contains merely an insignificant quantity of dissolved solvent, comprising a mixture of 46.7% by weight of N-hexene and 53.3% by weight of N-hexane. The rich solvent phase contains 5.9% by weight of hydrocarbon which is made up of 87.5% N-hexene and 12.5% by weight of N-hexane. On the basis of the previously indicated formula for the determination of selectivity, the latter factor for the above solvent composition is 8.0.

Utilizing the mixture of methylcyclopentane and benzene specified for Example I above, at the same extraction conditions, a solvency for this solvent composition of 6.1% is observed and the solvent has a selectivity of 8.2.

I claim as my invention:

1. A process for recovering a hydrocarbon having a relatively large carbon-to-hydrogen ratio from a mixture of the same with a hydrocarbon of relatively smaller carbon-to-carbon ratio which comprises contacting said mixture with an aqueous solution of a compound having the formula

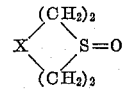

wherein X is selected from the group consisting of oxygen, sulfur and sulfoxy, said contact being effected at a temperature and pressure sufficient to maintain said solution in substantially liquid phase, and thereafter separating a hydrocarbon phase from a predominantly liquid solvent phase containing dissolved therein said hydrocarbon of relatively large carbon-to-hydrogen ratio.

2. The process of claim 1 further characterized in that said aqueous solution contains from about 0.5 to about 15% by weight of water.

3. The process of claim 1 further characterized in that said hydrocarbon of relatively large carbon-to-hydrogen ratio is an aromatic hydrocarbon and said hydrocarbon of relatively smaller carbon-to-hydrogen ratio is a saturated hydrocarbon.

4. The process of claim 1 further characterized in that said hydrocarbon of relatively large carbon-to-hydrogen ratio is an olefinic hydrocarbon and said hydrocarbon of smaller carbon-to-carbon ratio is a paraffinic hydrocarbon.

5. The process of claim 1 further characterized in that said solution and hydrocarbon mixture are contacted at a temperature not substantially in excess of about 200° C. and at a pressure sufficient to maintain said mixture and solution in substantially liquid phase at said temperature.

6. The process of claim 1 further characterized in that said liquid solvent phase is distilled and a hydrocarbon overhead recovered from the resulting solvent residue, substantially free of hydrocarbon solute.

References Cited in the file of this patent

UNITED STATES PATENTS

| | | |
|---|---|---|
| 2,365,898 | Morris et al. | Dec. 26, 1944 |
| 2,508,005 | Ballard et al. | May 16, 1950 |

OTHER REFERENCES

Fromm et al.: Berichte, vol. 56 (1923), pp. 2286 and 2287.